June 16, 1959  J. M. ALTENDORF  2,890,525
LAWN EDGING TOOL
Filed March 28, 1958
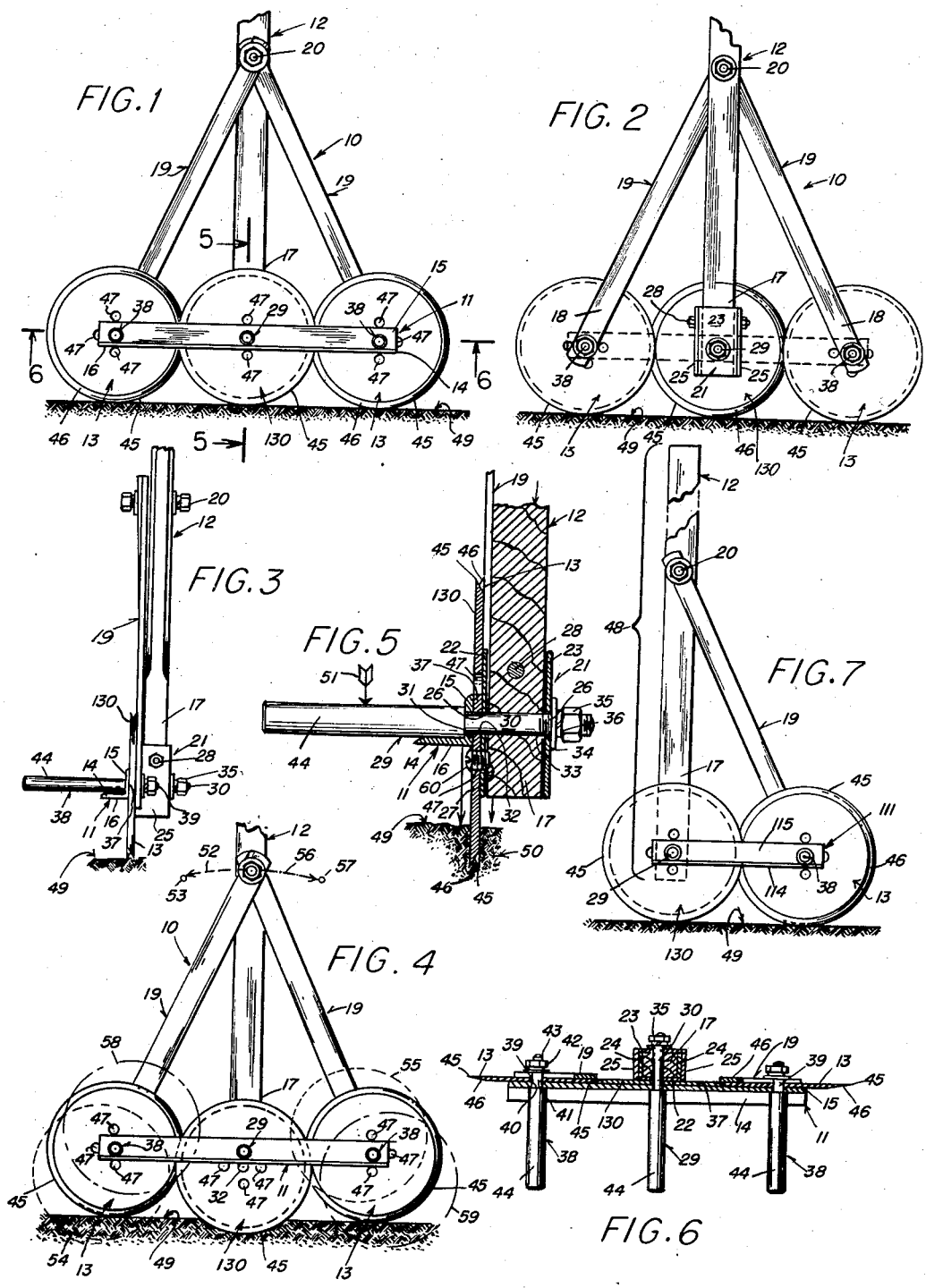

United States Patent Office 2,890,525
Patented June 16, 1959

2,890,525

LAWN EDGING TOOL

Joseph M. Altendorf, Port Washington, Wis.

Application March 28, 1958, Serial No. 724,552

6 Claims. (Cl. 30—307)

The present invention relates to lawn edge trimmers or lawn edging tools employable to trim the sod along beds, walks, etc.

A general object of the present invention is to provide a device of the hand tool type which is of simple and sturdy construction, the cutting parts thereof being preferably easily adjustable to effect a variety of desirable modifications each having its own advantages, the device featuring a plurality of cutting disks successively arranged in reverse order to assure provision of an effective substantially continuous scalloped or undulated cutting edge.

A more specific object of the invention is to provide such a hand tool in which a lateral frame member fixed to a stick handle carries a series of circular cutting disks so sharpened and with sectors of their cutting edges so overlapped as to provide an efficient scalloped or undulated cutting edge below the frame member together to form an elongated unbroken slit in sod upon downward thrust to a predetermined depth.

Another object of the invention is to provide such a sod trimming device which due to the shape of cutting edges requires a minimum of effort for insertion while allowing easy application of step-on loads and being sturdy enough to avoid buckling of blades under relatively heavy applied loads so as to permit effective cutting of heavy roots that may be encountered.

A further object of the invention is to provide such a device in which the plural-disk cutter may be adjusted in elevational outline as to provide a leading undulation of the undulated edge to facilitate insertion, the device being structurally such as to permit application of relatively great cutting power merely by rocking action.

Still another object of the invention is to provide a structural embodiment of the device which may be readily constructed in mass production, the different parts being few and simply assembled, and which allow efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which:

Fig. 1 is an inward side elevational view of an embodiment of the lawn edging tool of the present invention with the top portion of the stick handle broken away;

Fig. 2 is a side elevational view similar to Fig. 1 taken from the outward side of the device;

Fig. 3 is an end elevational view of the device shown in Figs. 1 and 2;

Fig. 4 is an inward side elevational view similar to Fig. 1 showing the center disk dropped down to provide a central leading undulation and indicating in dotted lines and dot-dash lines action of parts thereof during endwise rocking motion to facilitate cutting;

Fig. 5 is an enlarged sectional view, with parts broken away, taken substantially on line 5—5 of Fig. 1, illustrating action of the device in cutting down through sod for trimming an edge thereof, an additional holding means for the central cutting disk being proposed therein;

Fig. 6 is a sectional view to a smaller scale taken substantially on line 6—6 of Fig. 1; and Fig. 7 is an inward side elevational view of a modification of the device shown in Fig. 1, with a central portion of the stick handle broken away.

Referring to the drawing, in which like numerals identify similar parts throughout, it will be seen from Figs. 1 to 6 incl. that an embodiment of the present invention, shown at 10, may comprise a lateral frame member 11, an upwardly-extending stick handle 12 connected thereto, and a plurality of circular cutting disks 13, 13 and 130. As will be seen from Figs. 1 to 6 incl., the lateral frame member 11 preferably is in the form of a section of angle stock having a lateral flange 14 and a vertical flange 15, each of which may be about one-eighth of an inch (1/8") in thickness and having an outside face about one inch (1") wide. The lower or outside face 16 of the lateral flange 14 is adapted to serve as an abutment, limiting insertion of the cutting edges down into the sod. The vertical flange 15 is connected to lower end 17 of stick handle 12 and lower ends 18, 18 of angularly disposed bracket straps 19, 19 with the upper ends of the latter stacked and connected to the stick handle at a point 20 by suitable means, such as a through bolt, which may be in the form of a double-ended, externally-threaded pin, carrying nuts on opposite ends thereof.

The lower end 17 of the stick handle 12 is preferably provided with reinforcing socket means 21 which, as may be seen from Figs. 2, 3, 5 and 6, may consist of a pair of side facing plates 22 and 23, a pair of end facing bridge plates 24, 24, which, as will be seen from Fig. 6, have edge abutment with the inside faces of plates 22 and 23, and outside end facing plates 25, 25 covering the bridge plates 24, 24 and having inside face abutment with the edges of the side facing plates. Such socket structure facilitates manufacturing and assembly parts. The inward side placing plate 22 is provided with a through hole 26 adapted to receive therethrough suitable fastening means and outward side facing plate 23 is provided with a similar hole 26 to receive the handle fastening means therethrough. The bridge plates 24, 24 and their facing plates 25, 25 are provided with aligned holes through which, and the intervening lower end 17 of stick handle 12, a tie bolt 28 extends to tie them together. The inward side facing plate 22 preferably is provided with an additional lower hole 27 which is internally threaded for a purpose to be explained later.

The socketed lower end 17 of the stick handle 12 is connected to the lateral frame member 11 by means of a bolt 29 having a shank 30 successively to be received through a hole 31 in vertical flange 15 a central hole 32 in central disk 130, transverse hole 33 through stick handle lower portion 17, and with its externally-threaded outer end carrying beyond side facing plate 23 a washer 34, a nut 35, and an intervening lock washer 36. It will thus be seen that the central cutting disk 130 is interposed between frame member 11 and stick handle 12, and is abutted against outward side face 37 of vertical flange 15.

Somewhat similar bolts 38, 38 are employed to secure the bottom ends 18, 18 of the bracing straps 19, 19 to frame member 15 with each having a shank 39 externally threaded on its outer end and received through a hole 40 in vertical flange 15, a central hole 41 in cutter disk 13 and a suitable hole in the bottom end 18 of bracing strap 19 to receive beyond the latter a nut 42 with an intervening washer structure 43, if desired. Consequently, the end cutter disks 13, 13 are likewise face abutted to the outward side face 37 of vertical flange 15.

Although the lateral flange 14 of the frame member 11 may suitably serve as a ledge on which an operator may step to apply loading force to the tool when insertion in the sod is difficult, such as may be the case where it contains heavy roots, preferably each of the connecting or securing bolts 29 and 38, 38 is provided with an elongated, transversely-extending, rod-like head 44 which may serve as a step-on element to apply loading at the center of each cutter disk. It will be seen from Fig. 5 that the holes in vertical flange 15 are so located, and the diameters of the step-on rod-like bolt heads 44 are such that the undersides of the latter substantially contact the top face of lateral flange 14 so that the latter braces them.

It will be seen from Figs. 1 to 6 incl. that each of the cutting disks 13, 13 and 130 has a sharpened circular edge 45 formed by chamfering one side edge thereof to define an oblique annular face 46 which may be arranged at an angle of about 30°. The two end disks 13, 13 are mounted to the vertical flange 15 of frame member 11 in reverse order with respect to the mounting thereto of central cutter disk 130 so that segments of their sharp circular edges 45—45 are overlapped along the side of the frame member and with the oblique annular faces 46—46 thereof transversely opposed and juxtaposed to each other between the overlapping segments of the sharp edges, as will be understood from Figs. 1, 2 and 6. Consequently, an undulated lower cutting edge is provided by the three disks 13, 13 and 130 below the frame member 11 in which there is no gap which would tend to prevent a clean, continuous cut or slit and this permits the cutting disks which may be made of thirteen gauge (13 ga.) sheet steel to have a thickness of about ninety-five thousandths of an inch (0.095") to be arranged in a common vertical plane adjacent the outward side face 37 of the vertical flange 15. Each of these cutter disks 13, 13 and 130 may, if desired, be a little over five inches (5") in diameter and each preferably is provided with a central hole and four additional holes arranged on a circle described thereabout at points about 90° apart. For example, central disk 130 may have clustered about the central hole 32, four additional holes 47—47 and the end cutter disks 13, 13 will have similar holes therein, each intended selectively to receive therethrough the shank 30 or 39 of its securing bolt 29 or 38.

Let it be assumed that the parts of the embodiment illustrated in Figs. 1 to 6 incl. just described are assembled in the manner indicated in Figs. 1, 2, 3, 5 and 6 with the central holes of the cutter disks 13, 13 and 130 being employed for mounting them to the frame member 11. Also, assume that the stick handle 12 may be about four feet (4') long, which length is indicated at 48 in the Fig. 7 embodiment. In order to use to advantage this Figs. 1 to 6 incl. embodiment of the invention, the operator rests the cutting edges 45—45 of the cutter disks 13, 13 and 130 upon the sod surface, such as that indicated at 49 in Figs. 1 to 5 incl., along a line where it is desired to form a slit or trim the sod. The weight of the device may be such that only slight pressure on the handle 12 is required to insert the lower segments of the cutter blades extending below the lateral frame member, such as in the illustrated manner of Fig. 5, so as to trim off an edge 50 of the sod area. In such operation, the device is forced down until the lower face 16 of the lateral frame member flange 14 contacts the sod surface 49, thereby determining the depth of the cut. In the event that severable obstructions may be encountered, such as heavy roots, additional pressure may be applied by stepping on one or more of the step-on elements 44—44 in the direction of the arrow 51 indicated in Fig. 5. Also, cutting may be facilitated by rocking the device endwise with longitudinal swing of the stick handle 12. There need be no concern that the handle bottom end 17 and the socketing structure 21 may extend below the abutment face 16, as is indicated in Fig. 5, since the marginal zone or strip 50 of the sod is to be removed and localized depression thereof is of no concern; however, if desired, the bottom end of the handle and its socket may terminate in the horizontal plane of the abutment face 16.

In unusually firm sod, insertion of the tool may be facilitated by providing a leading undulation of the undulated cutting edge afforded by the three cutter disks, such as is proposed in Fig. 4 wherein the central disk 130 is shown as having been dropped down below the end disks 13, 13 by inserting its anchoring bolt 29 through one of the cluster holes 47. It will be understood, of course, that either of the end cutter disks 13, 13 may be made such a leading cutter, if desired. Rocking action of the device to facilitate cutting in firm sod by longitudinal swing of the stick handle 12 is graphically illustrated in Fig. 4 wherein it is indicated that swing to the left along the dotted line 52 to a point 53 causes the undulating cutting edge to swing up and down about the lower portion of the cutting edge 45 of central cutter disk 130 with the end cutter disks being rocked to the dotted positions thereof indicated at 54 and 55. When the stick handle 12 is swung back along the dot-dash line 56 to a point 57, the end cutter disks 13—13 are rocked to their positions indicated in dot-dash lines at 58 and 59 and the undulated cutting edge is thus gradually rocked into the sod surface by rocking action. The provision of the plurality of holes in each cutter disk also permits shifting of each disk so that a new sharp segment will constitute a part of the undulated cutting edge if that previously employed has been dulled by use.

As proposed in Fig. 5, provision may be made for securely holding the central cutter disk 130 firmly in place without allowing it to rotate or shift, and this may be accomplished by an additional short screw 60 which, as shown in Fig. 5, may be inserted through lower cluster hole 47 of the disk and threadedly engaged into the internally-threaded hole 27 in side plate 22. Such stabilization of the central cutter disk 130 assures that the three cutter disks will be held in desired alignment. It will be understood that if, as in the Fig. 4 embodiment, one of the cluster holes 47 of the central cutter disk be selected for securing the latter by bolt 29 its central hole 32 may be aligned with internally-threaded hole 27 and stabilizing screw 60 inserted therein. Similar stabilizing means may be employed, if desired, with respect to the end cutter disks 13, 13 with similar stabilizing screws threadedly engaged in internally-threaded holes in the bracing straps 19, 19.

Fig. 7 illustrates that the present invention is not limited to the employment of three cutter disks since as indicated there, one end of the frame member may be shortened to provide a frame member 111 of a length sufficient to reach between anchoring holes of the central disk 130 and a single end disk 13. Such an embodiment requires the use of only one of the bracing straps 19. It is obvious that a similar structure may be provided from the parts of the embodiment illustrated in Figs. 1 to 6 incl. by omitting one of the end disks 13, 13; and, of course, the device is adapted to the construction of a single cutter disk tool by omitting two of the others.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A lawn edging tool comprising, in combination, a lateral elongated frame member, an upwardly-extending stick handle connected to said frame member, a plurality of substantially flat and relatively thin sod-cutting disks each having relatively flat opposite side faces and a sharpened circular side edge in the plane of one of said side faces with an annular oblique edge face extending from said sharpened edge inwardly to the other side face through a certain radial distance, and means fastening said disks alternately in reverse order to one side of said member in substantially the same upwardly-extending plane with their side faces substantially aligned and with segments of their sharp circular edges overlapped along the side of said member a distance substantially no greater than said certain radial distance thereby limiting the lapping to the radial depth of one of the oblique annular edge faces, said oblique annular edge faces being transversely opposed and juxtaposed to each other between the overlapping segments of the sharp edges.

2. A lawn edging tool comprising, in combination; a lateral elongated frame member having an inward side, an outward side and a bottom face serving as a sod top-engaging face for limiting insertion of tool cutting edges; an upwardly-extending stick handle rigidly connected to said frame member and extending therefrom at an angle; means assuring maintenance of the angle between said member and handle; a plurality of substantially flat and relatively thin sod-cutting disks of substantially equal thickness each having relatively flat opposite side faces and a sharpened circular side edge in the plane of one of said side faces with an annular oblique edge face extending from said sharpened edge inwardly to the other side face through a certain radial distance; and a plurality of means fastening said disks alternately in reverse order to the outward side of said member in substantially the same upwardly-extending plane with their side faces substantially aligned and with segments of their sharp circular edges overlapping along the outward side of said member a distance substantially no greater than said certain radial distance thereby limiting the lapping to the radial depth of one of the oblique annular edge faces, said oblique annular edge faces being transversely opposed and juxtaposed to each other between the overlapping segments of the sharp edges.

3. The lawn edging tool defined in claim 2 characterized by said fastening means being removable and each of said disks having a plurality of holes therein selectively to receive said removable fastening means for variations of the sizes of the disk sectors below said member.

4. The lawn edging tool defined in claim 3 characterized by the provision of one of said removable fastening means for each of said disks with each having a transverse step-on portion extending inwardly from the inward side of said member.

5. A lawn edging tool comprising, in combination; a lateral elongated frame member in the form of a length of angle stock with one flange thereof being laterally arranged and having a substantially flat bottom face providing a sod top-engaging face with the other flange of the angle stock extending substantially vertical; an upwardly-extending stick handle rigidly connected to said length of angle stock and extending therefrom at an angle; means assuring maintenance of the angle between said length of angle stock and said handle; a plurality of substantially flat and relatively thin sod-cutting disks each having relatively flat opposite side faces and a sharpened circular edge in the plane of one of said side faces with an annular oblique edge face extending from said sharpened edge inwardly to the other side face through a certain radial distance, each of said disks having a plurality of holes therein selectively to receive a removable lateral fastening means to permit variations of sizes of disk sectors extending below said laterally-arranged flange; and a plurality of removable lateral fastening means each in the form of a bolt having a shank extending through a hole in said vertical flange and one of the holes in one of said disks with said bolts removably fastening said disks to said vertical flange alternately in reverse order in substantially the same upwardly-extending plane with their side faces substantially aligned and with segments of their sharp circular edges overlapped along the outward side of said vertical flange and with the oblique annular edge faces thereof transversely opposed and juxtaposed to each other between the overlapping segments of the sharp edges, each of said fastening bolts having a head in the form of an inwardly-extending elongated rod located immediately above said lateral flange and serving as a step-on portion thereof.

6. A lawn edging tool comprising, in combination; a laterally-extending length of angle stock serving as a frame member and having a laterally-arranged flange on its inward side serving as a sod top-engaging element, said frame member also having a vertical flange on its outward side; a vertical stick handle connected medially to said vertical flange on the outward side thereof; a pair of bracing means extending between said handle and the outward sides of the ends of said members rigidly holding them together in inverted T form; three removable bolts with one extending through said vertical flange and the lower end of said handle and each of the other two extending through said vertical flange and one of said bracing means, each of said bolts having an elongated rod-like head extending inwardly and located immediately above said lateral flange; and three flat sod-cutting disks each having a sharpened circular edge formed by chamfering one side edge thereof to define an oblique annular face adjacent its sharp circular edge, each disk having a hole therein through which one of said bolts extends with the central disk being interposed between said angle member and said handle and the other two end disks being interposed between said angle member and said bracing means, said central disk being reversed with respect to said end disks with segments of the sharp circular edges of each end disk and the central disk overlapped and with the oblique annular faces thereof transversely opposed and juxtaposed to each other between the overlapping segments of the sharp edges.

References Cited in the file of this patent

UNITED STATES PATENTS

D. 154,835   Bishop _____ Aug. 16, 1949

FOREIGN PATENTS 835 682   Germany _____ Apr. 3, 1952